United States Patent [19]
Eisen

[11] Patent Number: 5,612,515
[45] Date of Patent: Mar. 18, 1997

[54] PORTABLE WEIGHING SCALE HAVING A PIVOTAL WEIGHING PLATFORM

[76] Inventor: Saul Eisen, 29 Paerdegat 15 St., Brooklyn, N.Y. 11236

[21] Appl. No.: 364,798

[22] Filed: Dec. 27, 1994

[51] Int. Cl.⁶ .................................................. G01G 21/00
[52] U.S. Cl. ........................................... 177/126; 177/127
[58] Field of Search ..................................... 177/126, 127

[56] References Cited

U.S. PATENT DOCUMENTS

| | | | |
|---|---|---|---|
| 226,000 | 3/1880 | Reynolds | 177/126 |
| 2,181,272 | 11/1939 | Greenleaf | 177/126 |
| 2,823,911 | 2/1958 | Murphy | 177/126 |
| 2,872,178 | 2/1959 | Holland | 177/126 |
| 3,097,712 | 7/1963 | Johnson | 177/126 |
| 3,596,725 | 8/1971 | Homs | 177/126 |
| 3,732,938 | 5/1973 | Nelson | 177/126 |
| 4,033,420 | 7/1977 | De Masters | 177/126 |
| 4,288,131 | 9/1981 | Griffin | 177/126 X |
| 4,997,051 | 3/1991 | Maaz et al. | 177/126 X |

*Primary Examiner*—Michael L. Gellner
*Assistant Examiner*—Randy W. Gibson
*Attorney, Agent, or Firm*—Goodman & Teitelbaum, Esqs.

[57] ABSTRACT

A weighing scale having a weighing platform, and mechanisms for permitting the weighing platform to be pivoted upwardly from a lowered operational position to a raised non-operational position to reduce the required floor space therefor so that the weighing scale can be conveniently transported to another location for use, where the weighing platform is lowered to the operational position, or for storage thereof. Preferably, the weighing scale is provided with a stabilizing member to prevent the weighing scale from tipping over when the weighing platform is being raised or lowered, where the stabilizing member can also be raised and lowered between an operational position and a non-operational position. Preferably, fold-away ramps are provided on opposite sides of the weighing platform to provide easy access thereto. The pivotal movements of the weighing platform, the stabilizing member and the ramps between the operational and non-operational positions are required to be performed in a predetermined sequence.

24 Claims, 5 Drawing Sheets

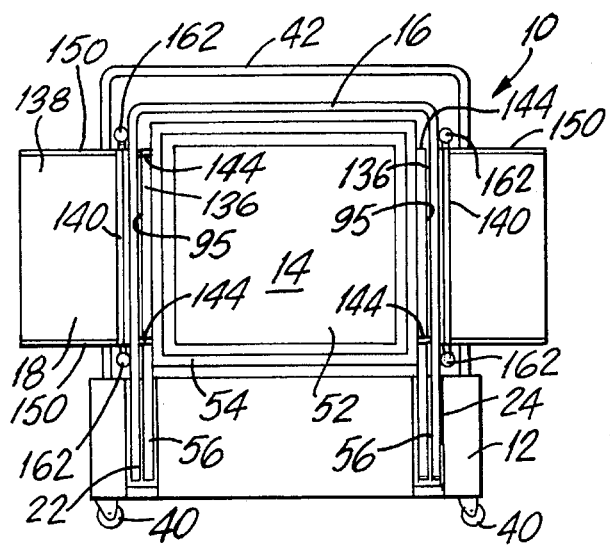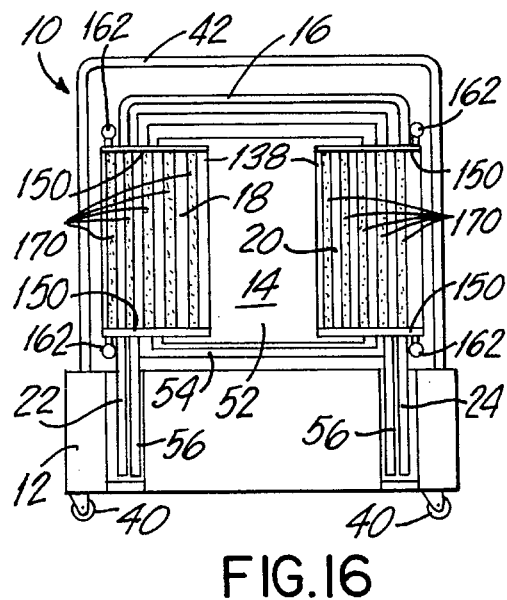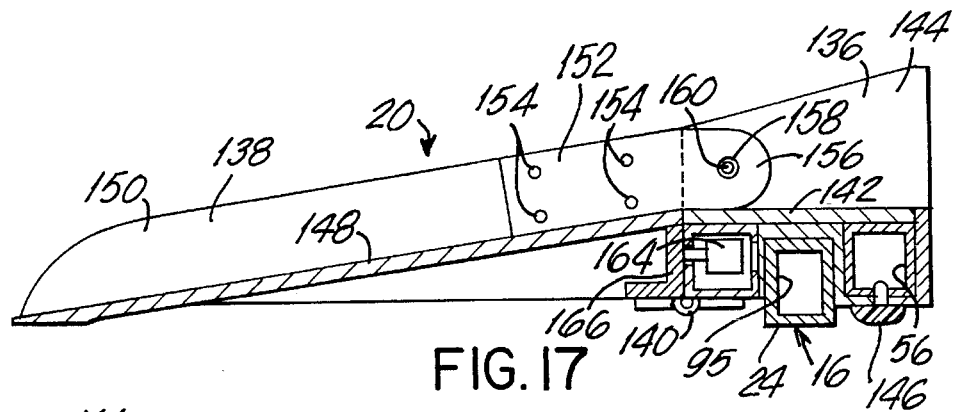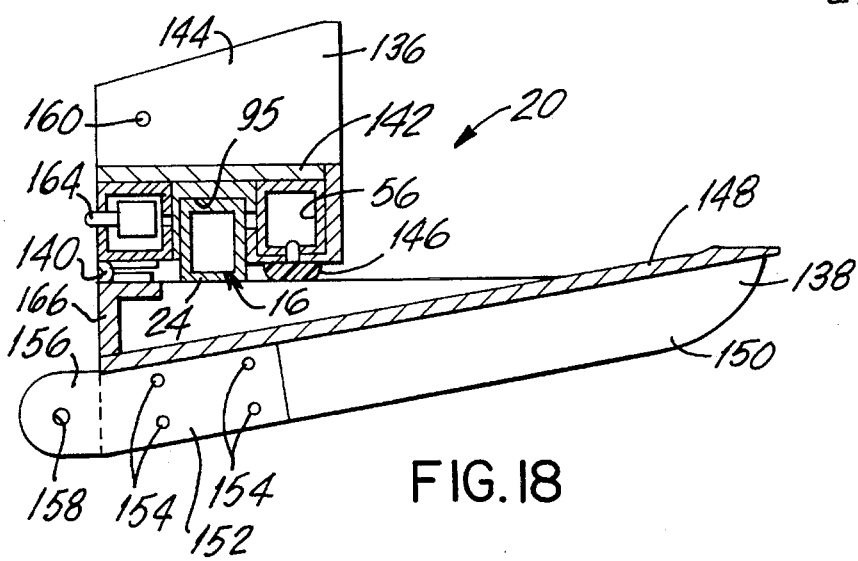

PORTABLE WEIGHING SCALE HAVING A PIVOTAL WEIGHING PLATFORM

BACKGROUND OF THE INVENTION

The invention relates to weighing scales and, more particularly, to a weighing scale having a weighing platform that can be pivoted upwardly from a lowered operational position to a raised non-operational position to reduce the required floor space thereof so that the weighing scale can be conveniently moved to another location for use or storage, preferably the weighing scale is provided with a stabilizing member to prevent the tipping over of the weighing scale when the weighing platform is being raised.

Weighing scales are well known in the art, where the weighing scale of the present invention is intended to weigh patients in hospitals and nursing homes, and residents in health care institutions and handicapped facilities, and particularly to permit the weighing of persons in wheelchairs and the like. Though weighing scales for weighing persons or patients confined to a bed, wheelchair and the like are also well known in the art, most of these prior art weighing scales require a large floor space during the use thereof in order to function, and cannot be easily transported or stored because of their size.

U.S. Pat. No. 4,033,420 discloses a weighing scale for receiving a hospital bed containing a patient, the weighing scale being provided with a pair of retractable ramps for rolling the bed onto the weighing rails.

U.S. Pat. No. 3,732,938 discloses a wheelchair weighing platform for supporting a wheelchair thereon, where a conventional weighing scale is attachable to the platform.

U.S. Pat. No. 3,961,675 discloses a pair of portable housings, each housing having a box-like shape for supporting the front and rear legs of a hospital bed. Weight responsive elements within each of the housings are electrically connected to a suitable read-out device for indicating the weight of the patient disposed on the hospital bed.

U.S. Pat. No. 4,006,789 discloses a scale for weighing hospital patients in their horizontal position, the scale including a horizontal base provided with a weighing platform, and a read-out indicator mounted on an upright support post.

U.S. Pat. No. 4,013,135 discloses a device for weighing patients in a sitting position, the device including a chair secured to a horizontal platform, and a read-out indicator mounted on a vertical post.

U.S. Pat. No. 2,539,570 discloses a folding portable scale in which an upstanding vertical tubing post folds down onto the platform of the scale.

Accordingly, there is presently a need for a weighing scale having a weighing platform that can be pivoted upwardly from a lowered operational position to a raised non-operational position to reduce the floor space required therefor so that the weighing scale can be conveniently moved to a new location for use or storage thereof, a weighing scale that includes a stabilizing member which prevents the weighing scale from tipping over when the weighing platform is being raised, and a weighing scale that also includes ramps on opposite sides of the weighing platform for easy access thereto which can be folded onto the weighing platform when the weighing scale is not in use.

SUMMARY OF THE INVENTION

It is, accordingly, an object of the present invention to provide a weighing scale which avoids the problems of the prior art devices.

Another object of the present invention is to provide a weighing scale having a weighing platform that can be pivoted upwardly away from a lowered operational position to a raised non-operational position to reduce the required floor space therefor so that the weighing scale can be conveniently transported to another location for use or storage.

A further object of the present invention is to provide a weighing scale provided with a stabilizing member to prevent the weighing scale from tipping over when the weighing platform is being raised and lowered.

Still another object of the present invention is to provide a weighing scale having fold-away ramps provided at opposite ends of the weighing platform.

Another object of the present invention is to provide a weighing scale provided with wheel means thereon for the transportation thereof.

A still further object of the present invention is to provide means for raising and lowering the weighing platform.

Another object of the present invention is to provide means for raising and lowering the stabilizing member.

Yet another object of the present invention is to provide a weighing scale that is convenient to operate, which includes safety means so that the pivoting movements of the weighing platform, the stabilizing member and the ramps are performed in a predetermined sequence.

Briefly, in accordance with the present invention, there is provided a weighing scale having a weighing platform, and means for permitting the weighing platform to be pivoted upwardly from a lowered operational position to a raised non-operational position to reduce the required floor space therefor so that the weighing scale can be conveniently transported to another location for use, where the weighing platform is lowered to the operational position, or for storage thereof. Preferably, the weighing scale is provided with a stabilizing member to prevent the weighing scale from tipping over when the weighing platform is being raised or lowered, where the stabilizing member can also be raised and lowered between an operational position and a non-operational position. Preferably, fold-away ramps are provided on opposite sides of the weighing platform to provide easy access thereto. The pivotal movements of the weighing platform, the stabilizing member and the ramps are required to be performed in a predetermined sequence.

BRIEF DESCRIPTION OF THE DRAWINGS

With the above and additional objects and advantages in view, as will hereinafter appear, this invention comprises the devices, combinations and arrangements of the parts hereinafter described by way of example and illustrated in the accompanying drawings of a preferred embodiment in which:

FIG. 15 is a rear elevational view of FIG. 9, showing the weighing platform and the stabilizing member in the raised non-operational position;

FIG. 16 is a rear elevational view similar to FIG. 15, showing the ramps in a non-operational folded position;

FIG. 17 is a cross-sectional side elevational view showing one of the ramps in its outwardly extended position; and FIG. 18 is a cross-sectional side elevational view showing the ramp of FIG. 17 in its folded position.

In the various figures of the drawings, like reference characters designate like parts.

DESCRIPTION OF THE PREFERRED EMBODIMENT

Figure 1:
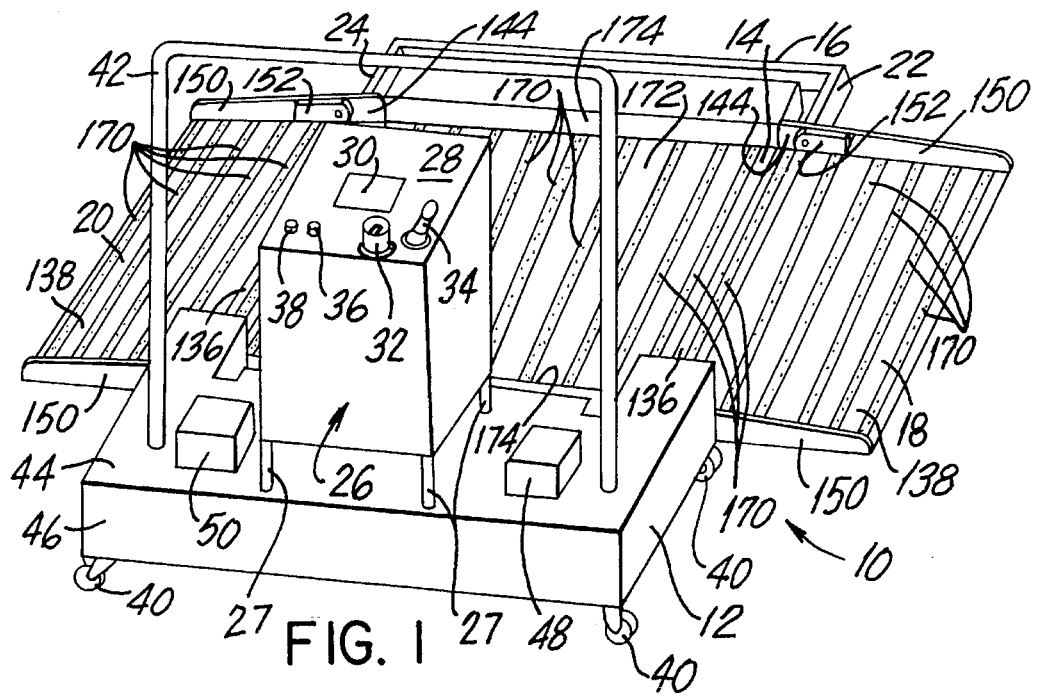
FIG. 1 is a perspective view showing a weighing scale in accordance with the present invention.

Referring now to the drawings, FIG. 1 shows a weighing scale 10 pursuant to the present invention, the weighing scale 10 being in a lowered operational position. The weighing scale 10 includes a support member 12 having a weighing platform 14 pivotally connected to an inner longitudinal side thereof, as will be more fully discussed below. A stabilizing member 16 is also pivotally connected to the support member 12 on the same side as the weighing platform 14, as will also be discussed below. The stabilizing member 16 forms a frame around the outer perimeter of the weighing platform 14 so that the weighing platform 14 sits within the frame of the stabilizing member 16 when the weighing platform 14 and the stabilizing member 16 rest on the floor or ground, as shown in FIG. 1. Preferably, pivotable ramps 18, 20 are provided on opposite longitudinal ends of the weighing platform 14, where the ramps 18, 20 are disposed over the frame side portions 22, 24 of the stabilizing member 16, a further discussion of the ramps 18, 20 being set forth below.

A control housing 26 is mounted on the support member 12, preferably being supported by four vertical legs 27 disposed at each bottom corner thereof. The control housing 26 includes a top control panel 28 which is preferably inclined so that the operator can conveniently have access to the controls thereon. The control panel 28 includes weight indicating means 30, such as a conventional screen, for indicating the weight of the person, or patient disposed on the weighing platform 14. The weight indicating means 30 is electronically connected to the weighing platform 14 by suitable means well known in the art which extends through the control housing 26 to the weighing platform 14. It is understood, that the weight indicating means 30 can be adjusted to account for a patient disposed on the weighing platform 14 with a walker, crutches, cane, or sitting in a wheel chair, a Geri chair, a reclining chair and the like so that only the patient's weight is displayed on the weight indicating means 30.

Additionally, the control panel 28 includes a conventional key lock 32 which receives a proper key to activate the electronics of the weighing scale 10. A hand grip or joy stick 34 is also provided on the control panel 28 to independently pivot the weighing platform 14 and the stabilizing member 16 up and down as will be discussed below. Furthermore, two safety push-button switches 36, 38 are also provided on the control panel 28, the function of which will be explained below.

Preferably, the support member 12 is provided with four wheels or rollers 40 on the bottom corner portions thereof so that, when the weighing platform 14 and stabilizing member 16 are in their raised non-operational positions, the weighing scale 10 becomes portable and can be easily moved to another location for either further use thereof or for storage.

To aid in the movement or to facilitate the transportation of the weighing scale 10 when in the portable position, a U-shaped support bar 42 is secured to the top wall 44 of the support member 12 adjacent to the front wall 46 of the support member 12. Preferably, the support bar 42 extends above the control panel 28 of the control housing 26. Additionally, two housings 48, 50 are disposed on the top wall 44 of the support member 12 on opposite sides of the control housing 26, being spaced between the legs of the support bar 42. The housings 48, 50 contain the mechanism means for raising and lowering the stabilizing member 16, as will be discussed below.

Figure 2:
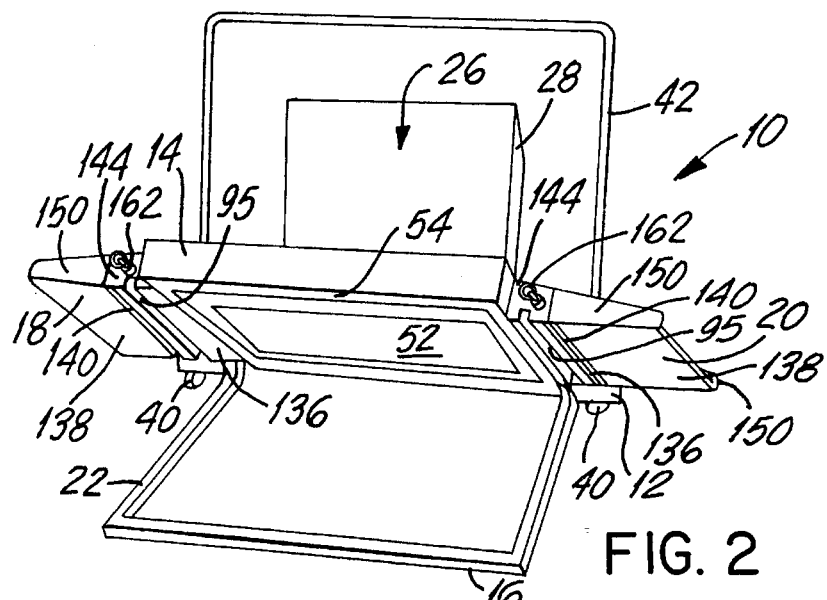
FIG. 2 is a side perspective view showing the weighing platform of the weighing scale being pivoted to a raised position.
Figure 8:
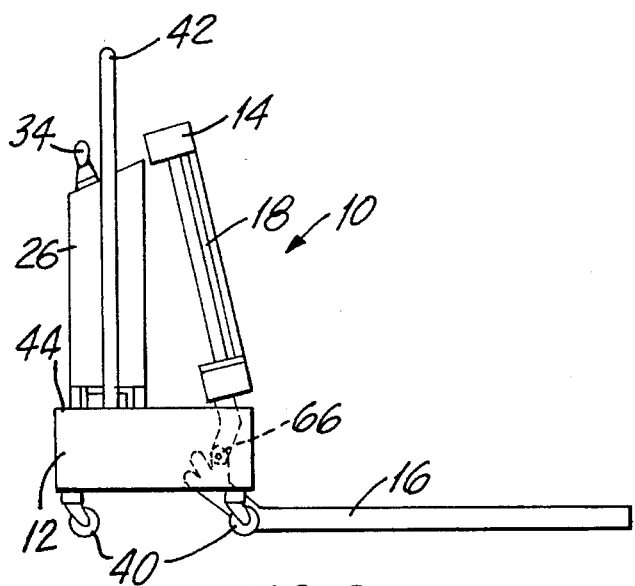
FIG. 8 is a side elevational view showing the weighing platform in the raised non-operational position.

As shown in FIG. 2, the weighing platform 14, together with the ramps 18, 20, is being raised to a non-operational position, where the mechanism for raising same will be discussed below. Accordingly, the stabilizing member 16 is still disposed in its lowered operational position on the floor or ground to support the weight of the weighing platform 14, so that the weighing scale 10 does not tip over while the weighing platform 14 and the ramps 18, 20 are being pivoted to the raised non-operational position. It is noted, that the weighing platform 14 in the fully raised non-operational position, as shown in FIG. 8, is vertically inclined passed the vertically perpendicular position relative to the top wall 44 of the support member 12, so that the weighing platform 14 is pivoted more than 90 degrees from the floor or ground when fully raised. Thus, in this vertically inclined fully raised position, as shown in FIG. 8, the center of gravity of the weighing platform 14 is positioned above the support member 12 to maintain the stability thereof, and thus prevent the weighing platform 14 from tipping the weighing scale 10 over, so that the stabilizing member 16 is no longer required to prevent the tipping thereof.

Figure 3:
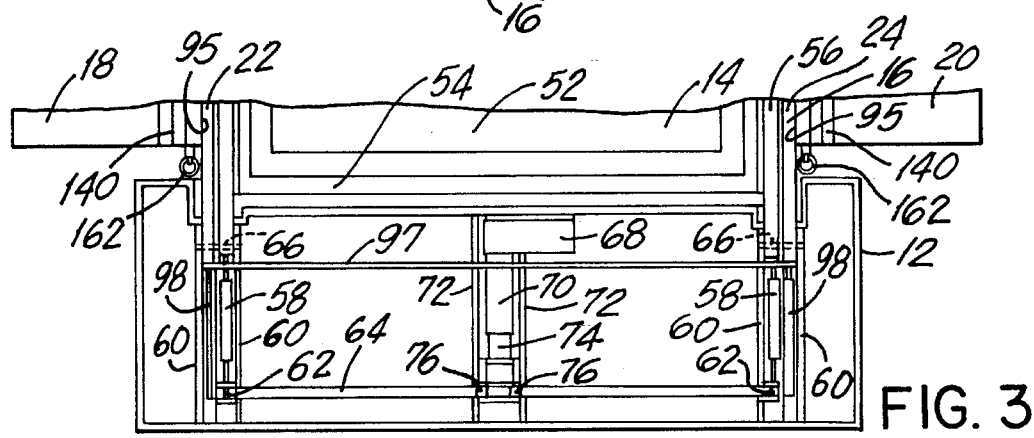
FIG. 3 is a fragmented bottom plan view showing the mechanism for raising and lowering the weighing platform.

FIG. 3 shows a partial view of the weighing platform 14 and the ramps 18, 20, and also shows a bottom view of the support member 12 with the bottom panel, on which the wheels or rollers 40 are mounted, removed therefrom to show the relevant mechanism therein. The weighing platform 14 includes a commercially available scale 52 which is fixedly mounted by suitable means within a support frame 54 for movement therewith. A pair of side rails 56 are securely fixed by conventional means to the opposite transverse sides of the support frame 54 for movement therewith. Lever means 58, disposed within partition walls 60, connects each side rail 56 to an associated one of a pair of cam members 62 which are fixedly secured to opposite ends of a longitudinally extending bar 64 rotatably mounted within the support member 12 for rotation therein, as will be explained below. It is noted, that pins 66 pivotally secure the ends of each of the side rails 56 to associated ones of the partition walls 60, as will be explained below.

A conventional motor 68 is also mounted within the support member 12 for activating a conventional ball-screw mechanism 70 disposed between partition walls 72 of the support member 12. The ball-screw mechanism 70 includes a piston 74 which is connected between a pair of cam members 76 disposed on opposite sides thereof. The cam members 76 are fixedly connected to a central portion of the bar 64 for rotation therewith, as will be explained below.

Figure 4:
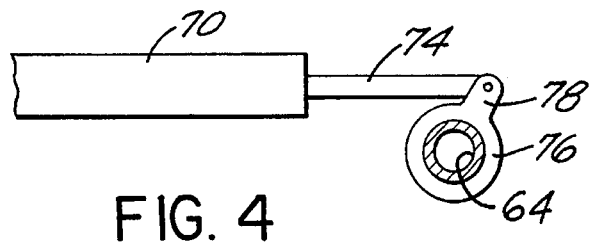
FIG. 4 is a fragmented side elevational view, partly in cross section, showing the piston of FIG. 3 in an extended position to maintain the weighing platform in its lowered operational position.
Figure 5:
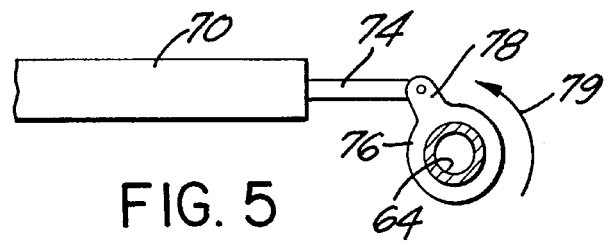
FIG. 5 is a fragmented side elevational view, partly in cross section, showing the piston of FIG. 3 in a retracted position to maintain the weighing platform in its raised non-operational position.
Figure 6:
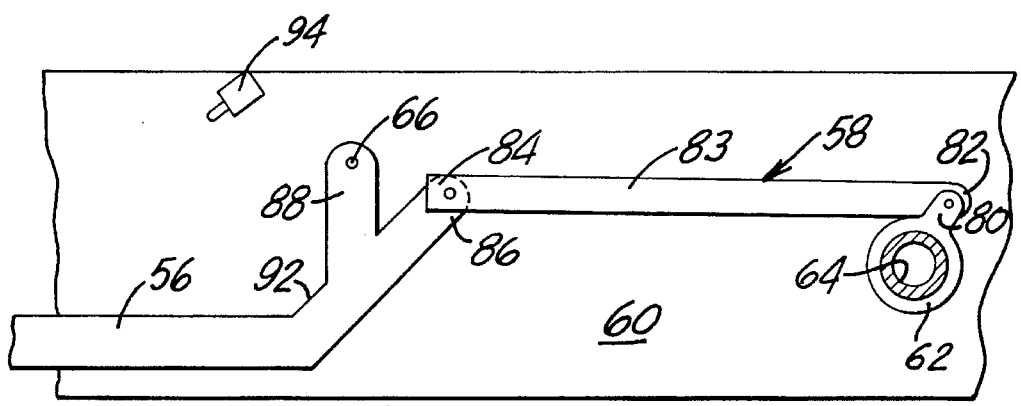
FIG. 6 is a fragmented side elevational view showing the lever mechanism in position for maintaining the weighing platform in the lowered operational position.

Referring now to FIGS. 4–7, the mechanism for raising the weighing platform 14 will now be explained. It is noted, that FIG. 4 shows the position of the ball-screw mechanism 70 relative to the cam members 76, and FIG. 6 shows one of the side rails 56 relative to its associated cam member 62, when the weighing platform 14 is in the lowered operational position, as shown in FIG. 1. Accordingly, a proper key is inserted into the key lock 32 and turned to turn on the electrical power to activate the weighing scale 10. Push-button switch 36 is now depressed and held in while the operator with the other hand operates the joy stick 34 by moving the joy stick 34 forwardly towards the operator so that the motor 68 is activated. It is noted, that the electronic and electric means and connections are conventionally well known to those skilled in the art, and therefore are not described or shown in the drawings.

When the motor 68 is activated by the forward movement of the joy stick 34, the ball-screw mechanism 70 retracts the piston 74 therein, as long as the push-button switch 36 is depressed, to the final retracted position of the piston 74 showing in FIG. 5. Accordingly, the outer end of the piston 74 is fixedly connected between the ears 78 of the pair of cam members 76, so that the piston 74 causes the cam members 76 to rotate counterclockwise as viewed in FIG. 5. In turn, the cam members 76 cause the bar 64 to also rotate counterclockwise in the direction of arrow 79.

Figure 7:
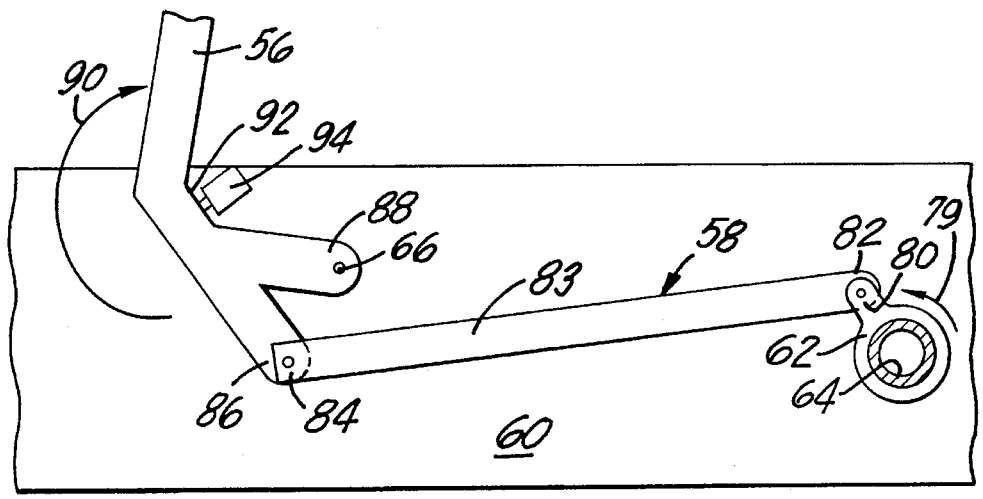
FIG. 7 is a fragmented side elevational view showing the lever mechanism in position for maintaining the weighing platform in the raised non-operational position.

When the bar 64 rotates counterclockwise in the direction of arrow 79, the cam members 62 at the opposite ends thereof also rotate counterclockwise, as shown in FIG. 7. As shown in FIGS. 6 and 7, an ear 80 on each of the cam members 62 is connected to one end 82 of each rod 83 of the lever means 58 so that the rod 83 is moved to the left as viewed in FIG. 7. The opposite end 84 of each of the rods 83 is connected to an arm portion 86 at the end of each of the side rails 56. Accordingly, the pin 66 extends through another arm portion 88, so that when the rod 83 moves to the left as viewed in FIG. 7, each of the side rails 56 is caused to rotate around its associated pin 66 in a clockwise direction as indicated by arrow 90.

Once the side rails 56, and the weighing platform 14 connected thereto, reach the final raised non-operational position, as shown in FIG. 8, an edge portion 92 of each of the side rails 56 engages and closes a conventional switch 94. Accordingly, the switch 94 deactivates the motor 68 so that the operator can release the push-button switch 36 and the joy stick 34. The operator can now proceed to raise the stabilizing member 16, in the manner set forth below.

Figure 9:
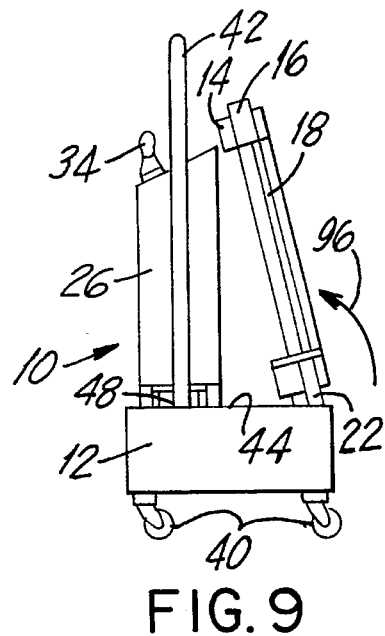
FIG. 9 is a side elevational view showing the stabilizing member in a raised non-operational position.

As shown in FIG. 9, the stabilizing member 16 is in a raised non-operational position. It is noted, that frame side portions 22, 24 of the stabilizing member 16 are received in transverse recesses 95 provided in the ramps 18, 20, as best shown in FIG. 2, as will be discussed below. Furthermore, as indicated above, when the weighing platform 14 is in an inclined raised non-operational position, the distributed weight of the weighing platform 14 on the support member 12 is sufficient to maintain the support member 12 in a non-tiltable position when the stabilizing member 16 is being raised, in the direction of arrow 96, to the position shown in FIG. 9.

Referring again to FIG. 3, the mechanism for raising the stabilizing member 16 will now be discussed. The frame side portions 22, 24 extend into the support member 12 between the partition walls 60, and the above mentioned pins 66 pivotally secure the end ends of each of the frame side portions 22, 24 to associated ones of the partition walls 60, so that the pins 66 independently secure both the stabilizing member 16 and the weighing platform 14 to the support member 12. It is noted, that a longitudinally extending bar 97 connects the end portions of the frame side portions 22, 24 together to complete the frame construction of the stabilizing member 16, as will be further discussed below. Additionally, lever means 98 connect the end portions of each of the frame side members 22, 24 to associated cam members 100, as best shown in FIGS. 13 and 14 to which reference will now be made.

Figure 10:
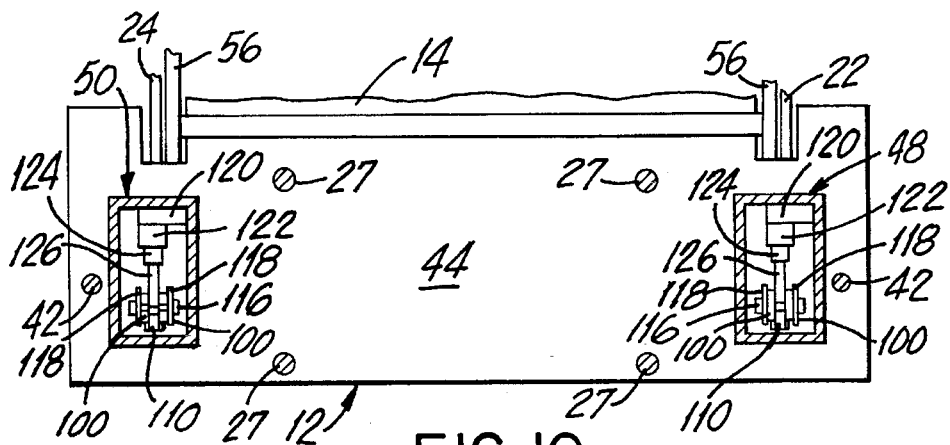
FIG. 10 is a fragmented top elevational view, partly in cross section, showing the mechanism for raising and lowering the stabilizing member.
Figure 13:
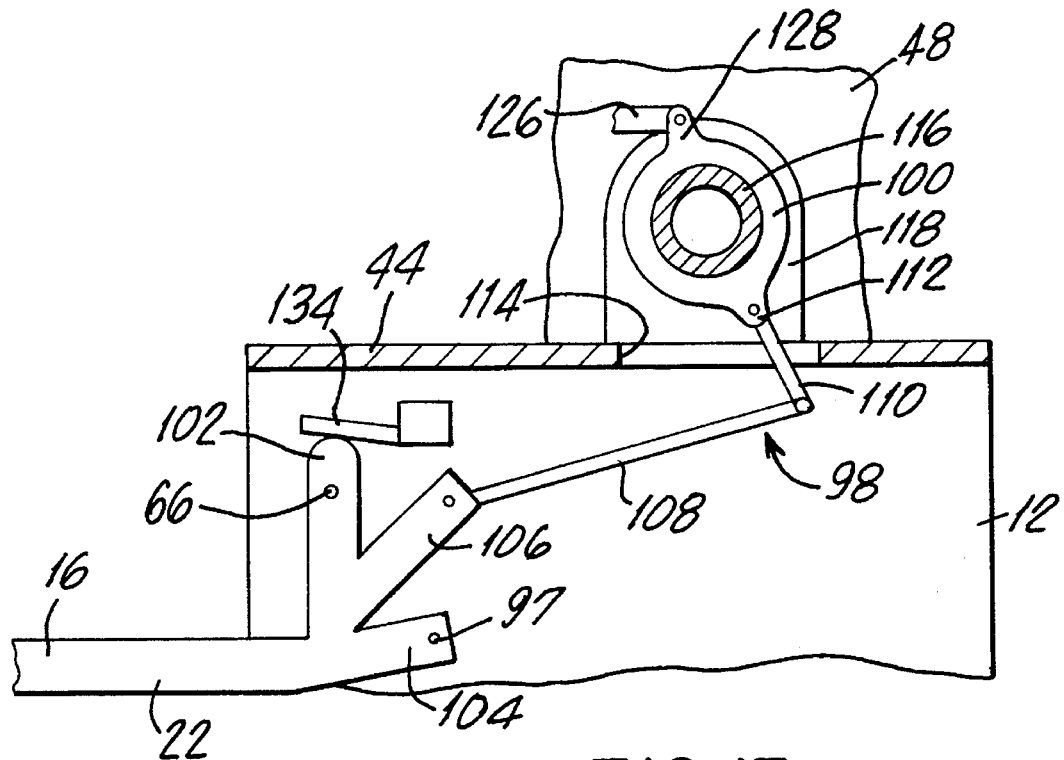
FIG. 13 is a fragmented cross-sectional side elevational view showing the lever mechanism in position for maintaining the stabilizing member in the lowered operational position.
Figure 14:
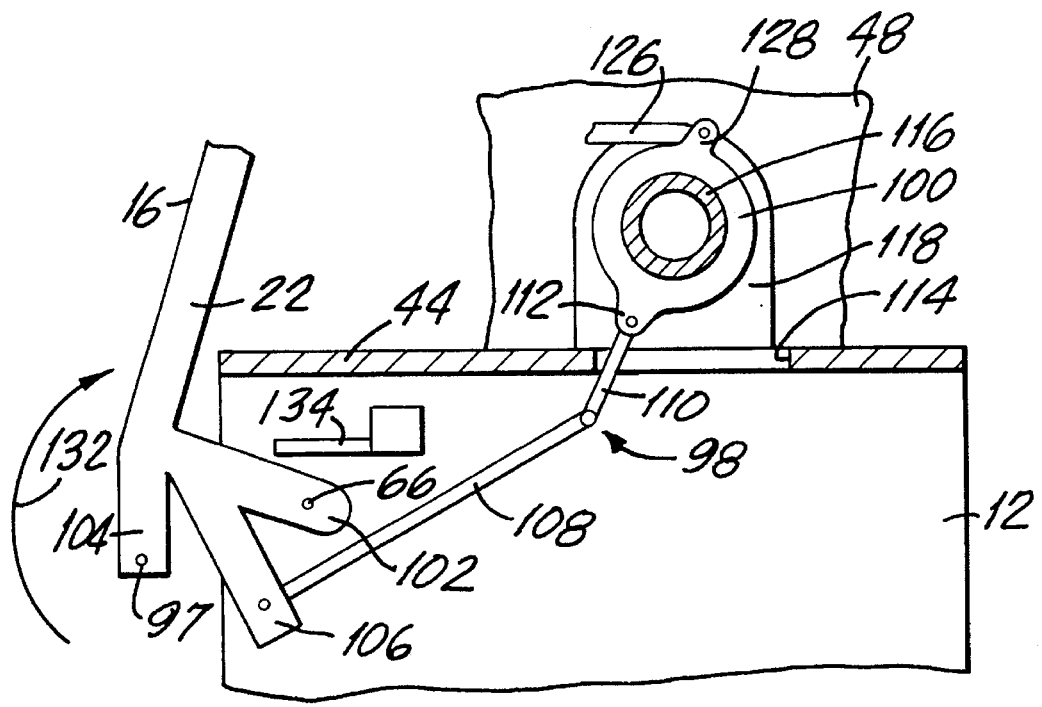
FIG. 14 is a fragmented cross-sectional side elevational view showing the lever mechanism in position for maintaining the stabilizing member in a raised non-operational position.

As shown in FIGS. 13 and 14, the end portions of each of the frame side portions 22, 24 of the stabilizing member 16 are provided with three arm portions 102, 104 and 106. Each of the arm portions 102 receives an associated one of the pins 66, and the arm portions 104 are connected together by the bar 97, where each of the arm portions 106 is pivotally connected to the lever means 98. Preferably, each lever means 98 includes a first rod 108 pivotally connected to the arm portion 106 at one end thereof, with the other end thereof being pivotally connected to another rod 110. Each rod 110 is pivotally connected at the opposite end thereof between a pair of ears 112, one ear 112 being provided on each cam member 100. It is noted, that each of the cam members 100 is mounted on the top wall 44 of the support member 12, a pair of cam members 100 being disposed within an associated one of the housings 48, 50, as best shown in FIG. 10. It is also noted, that the top wall 44 of the support member 12 is provided with a pair of slots 114 therethrough, each slot 114 receiving an associated one of the rods 110 therethrough to permit the rods 110 to function in a back and forth motion, as set forth below.

Figure 11:
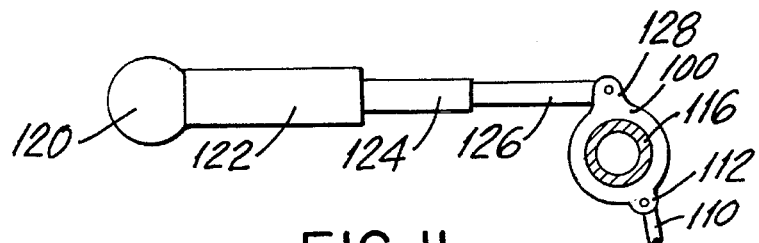
FIG. 11 is a side elevational view, partly in cross section, showing the piston of FIG. 10 in a retracted position for maintaining the stabilizing member in its lowered operational position.
Figure 12:
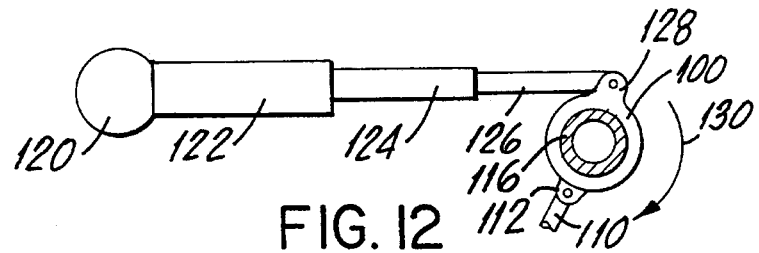
FIG. 12 is a side elevational view, partly in cross section, showing the piston of FIG. 10 in an extended position for maintaining the stabilizing member in its raised non-operational position.

As shown in FIG. 10, each of the housings 48, 50 includes a pair of cam members 100 mounted on an axle 116, each axle 116 being pivotally supported by a pair of upstanding flanges 118 disposed at opposite ends thereof. A conventional motor 120 is also mounted within the housings 48, 50, for activating a conventional ball-screw mechanism 122 having a piston 124 which is connected to one end of a rod 126. As best shown in FIGS. 11, 12, each cam member 100 is provided with a second ear 128, the ear 128 being approximately diagonally opposite the ear 112. Each rod 126 is pivotally connected between the ears 128 of a pair of cam members 100.

Referring to FIGS. 11–14, the mechanism and procedure for raising the stabilizing member 16 will now be explained, it being noted that FIGS. 11 and 13 show the position of the mechanism when the stabilizing member 16 is in a lowered operational position, as shown in FIG. 8. The push-button switch 38 is now depressed and held in while the operator with the other hand operates the joy stick 34 by moving the joy stick 34 forwardly towards the operator so that both motors 120 are activated. However, it is noted, that as a safety precaution to avoid the weighing scale 10 from tipping over due to the weighing platform 14 not being properly positioned on the support member 12, the push-button switch 38 cannot be depressed unless the switch 94 is closed by the side rails 56 in the manner mentioned above. Here again, the electronic and electric means and connections for this operation are conventional and well known to those skilled in the art and, therefore, are not described or shown in the drawings.

When the motors 120 are activated by the forward movement of the joy stick 34, each ball-screw mechanism 122 extends the piston 124 outwardly, as the push-button switch 38 is being depressed, to the extended position of the piston 124 shown in FIG. 12. Accordingly, each piston 124 moves its associated rod 126 to the right, as shown in FIG. 12, which, in turn, acts on the ears 128 of the cam members 100 to cause the cam members 100 to rotate clockwise in the direction of arrow 130. Accordingly, the other ear 112 of the cam members 100 is also rotated clockwise to cause the rod 110 connected thereto to move to the left as viewed in FIG. 14. In turn, the other rod 108 is also moved to the left, thereby causing the arm portion 106 to pivot around the pin 66 so that the frame side portions 22, 24 of the stabilizing member 16 are also caused to rotate around their associated pins 66 in the direction of the arrow 32 shown in FIG. 14. Thus, the stabilizing member 16 is raised to its non-operational position, as shown in FIG. 9. Once the frame side portions 22, 24 are received in the recesses 95 formed in the ramps 18, 20, the operator can release the push-button switch 38 and the toggle switch 34 to deactivate the motors 120.

It is noted, as shown in FIG. 13, that an associated switch 134 is engaged and closed by each of the arm portions 102 of the stabilizing member 16 when the stabilizing member 16 is in its lowered position. However, during the above operation, each arm portion 102 releases and opens its associated switch 134, as shown in FIG. 14. The switches 134 function as a safety device whereby the push-button switch 36, which is required to be depressed when raising and lowering the weighing platform 14, cannot be depressed unless each of the switches 134 is closed. Therefore, unless the switches 134 are closed, which is only when the stabilizing member 16 is in the lowered operational position, the weighing platform 14 cannot be lowered or raised.

The weighing scale 10 is now in the position shown in FIGS. 9 and 15, with the ramps 18, 20 extending outwardly from the weighing platform 14. However, before the ramps 18, 20 can be pivoted to their non-operational folded position shown in FIG. 16, the ramps 18, 20 must be released from their locked outwardly extending operational position. Each ramp 18, 20 includes two portions 136 and 138, such as shown by ramp 20 in FIGS. 17 and 18, which are pivotally secured together by a transversely extending conventional hinge 140 provided on the underside thereof so that the ramp portion 138 can be pivoted against the underside of the weighing platform 14, as shown in FIG. 16. Each ramp portion 136, as best shown in FIGS. 1 and 2, is fixedly secured by conventional means to an associated transverse side of the weighing platform 14, and includes a bottom wall 142 with a guide rail 144 at opposite transverse ends thereof. As shown in FIGS. 17 and 18, the side rail 56 of the weighing platform 14 is secured below the bottom wall 142, and an associated one of the frame side portions 22 of the stabilizing member 16 is removably disposed within the above-mentioned recesses 95 provided in the underside of the ramp portion 136. Preferably, a rubber-like foot pad 146 is disposed on the underside of the ramp portion 136 for engagement with floor or ground in a conventional manner.

The ramp portion 138 includes a bottom wall 148 which is positioned between guide rails 150 secured at opposite transverse ends thereof in such a manner that the bottom wall 148 is inclined downwardly from the bottom wall 124 of the ramp portion 136 to the floor or ground, as shown in FIG. 17, so that a wheelchair and the like could easily be wheeled up the ramp portion 138 onto the weighing platform 14, and then wheeled down therefrom. A latch 152 is secured by conventional means, such as rivets 154, to the inner surface of each of the guide rails 150 of the ramp portion 138 so that an ear portion 156 thereof extends outwardly for positioning against an associated guide rail 144 of the ramp portion 136. Each ear portion 156 has a hole 158 therethrough to receive a conventional associated spring-biased pin 160 therethrough. A conventional finger-ring 162, as shown in FIGS. 2, 3, 15 and 16, is connected in a conventional manner to the outer portion of each spring-biased pin 160. Thus, the operator pulls the finger-ring 162 on the opposite transverse sides of each of the ramps 18, 20 to withdraw each spring-biased pin 160 from each associated hole 158 in the ear portions 156 of the latches 152, so that each ramp portion 138 is now free to pivot relative to each associated ramp portion 136 to its folded position, as best shown in FIG. 18, placing the weighing scale 10 in the position shown in FIG. 16.

It is noted, that each ramp portion 136 also includes a switch 164. As shown in FIG. 17, a transverse wall 166 of each ramp portion 138 engages and closes an associated switch 164 when the ramps 18, 20 are in the outwardly extended operational position. However, when the ramp portion 138 is pivoted to the folded position, as shown in FIG. 18, the switch 164 is released and opened. The switch 164 functions as a safety switch, whereby the push-button switch 38, which is required to be depressed when raising and lowering the stabilizing member 16, cannot be depressed unless both switches 164 are closed by their associated walls 166. Therefore, unless the switches 164 are closed, which is only when the ramps 18, 20 are in the outwardly extended operational position, the stabilizing member 16 cannot be lowered or raised, thus acting to safeguard the ramps 18, 20 which are disposed over the frame side portions 22, 24 when in their folded position, as indicated in FIGS. 16 and 18.

Thus, with the weighing scale 10 in the non-operational position, as shown in FIG. 16, both push-button switches 36, 38 are non-operationable and cannot be depressed, where the opened switch 164 prevents the push-bottom 38 from being depressed even though the switch 94 is closed, and the opened switch 134 prevents the push-button switch 36 from being depressed. Accordingly, the key can now be removed from the key lock 32. It is further noted, that the pivotal movements of the weighing platform 14, the stabilizing member 16 and the ramps 18, 20 between the operational and non-operational positions are required to be performed in a predetermined sequence, as mentioned above, and as set forth below.

To once again place the weighing scale 10 in the operational position, as shown in FIG. 1, the above procedure is reversed. Accordingly, first, the operator swings the ramp portions 138 outwardly to pivot same away from the weighing platform 14. Once the ramps 18, 20 are in the outwardly extended operational position, as shown best in FIG. 15, the spring-biased pins 160 will manually snap into their associated holes 158 in the ear portions 156 of the latches 152 to secure the ramps 18, 20 in the outwardly extended operational position, and also the switches 164 are now closed so that the push-button switch 38 can now be operated. If not done already, the key must now be used to turn the key lock 32. The operator now depresses the push-button switch 38 and moves the joy stick 34 away in a rearward direction to activate the motors 120 in the reverse direction so that the pistons 124 of the ball-screw mechanisms 122 are retracted to rotate the cam members 100 in a counterclockwise direction so. The rotating cam members 100 cause the lever means 98 to pull on the arm portions 106 to rotate the stabilizing member 16 around the pins 66 into its lowered operational position on the floor or ground, as shown in FIG. 13, in which position the switch 134 is once again closed so that the push-button switch 36 can be operated.

The operator now depresses the push-button switch 36, and once again moves the joy stick 34 away in a rearward direction to activate the motor 68. The motor 68 moves in a reverse direction so that the piston 74 of the ball-screw mechanism 70 is extended outwardly to rotate the cam members 76 and the axle 64 in a clockwise direction so that the axle 64 moves the cam members 62 in a clockwise direction. The rods 58 pull on the arm portions 86 of the side rails 56 to rotate same around the pins 66 to their lowered operational position, as shown in FIG. 16, thus moving the weighing platform 14 therewith so that the weighing platform 14 is now positioned on the floor or ground, as shown in FIG. 1. It is noted, that in this position, the switch 94 is open so that the push-button switch 38 once again cannot be depressed. The key remains in the key lock 32 so that the weighing platform 14 is activated for weighing per sons.

Preferably, as best shown in FIGS. 1 and 16, commercially available non-skid strips 170 are provided on the upper surfaces of the bottom walls 142, 148 of the ramps 18, 20 as well as on the upper surface 172 of the weighing platform 14. It is noted, as best shown in FIG. 1, that the weighing platform 14 is also provided with a guide wall member 174 at opposite transverse ends thereof which is in alignment with the guide rails 144, 150 of the ramps 18, 20.

Though the support member 12 of the weighing scale 10 is shown to be provided with wheels or rollers 40, it is understood that the support member 12 could rest in a stationary position directly on the floor or ground or, if desired, could be mounted by suitable means on a wall in a conventional manner well known in the art.

Numerous alterations of the structures herein disclosed will suggest themselves to those skilled in the art. However, it is to be understood that the present disclosure relates to a preferred embodiment of the invention which is for the purpose of illustration only, and is not to be construed as a limitation of the invention.

What is claimed is:

1. A weighing scale comprising:

a support member;

a weighing platform pivotally connected to said support member for weighing persons;

first means for pivoting said weighing platform between a horizontal, lowered operational position and a vertical, raised non-operational position;

said support member being provided with wheel means for transporting said weighing scale along a floor or ground when said weighing platform is in said vertical, raised non-operational position;

stabilizing means being connected to said support member for resting on the floor or ground to prevent said weighing scale from tipping over when said weighing platform is being raised and lowered between said horizontal, lowered operational position and said vertical, raised non-operational position; and second means for pivoting said stabilizing means between a horizontal, lowered operational position on the floor or ground and a vertical, raised non-operational position spaced from the floor or ground so that said weighing scale can be transported by said wheel means;

whereby said weighing scale has a reduced floor space when said weighing platform and said stabilizing means are in their vertical, raised non-operational positions so that said weighing scale can be transported to another location for use, or for storage thereof.

2. A weighing scale according to claim 1, wherein said support member is provided with a U-shaped support bar extending upwardly therefrom to facilitate said transporting of said weighing scale.

3. A weighing scale according to claim 1, including positioning means to permit said weighing platform to be inclined relative to said support member when in said vertical, raised non-operational position so that center of gravity of said weighing platform is disposed over said support member in a predetermined position to prevent said weighing scale from tipping over.

4. A weighing scale comprising:

a support member;

a weighing platform pivotally connected to said support member for weighing persons;

means for pivoting said weighing platform between a horizontal, lowered operational position and a vertical, raised non-operational position;

stabilizing means being connected to said support member to prevent said weighing scale from tipping over when said weighing platform is being raised and lowered between said horizontal, lowered operational position and said vertical, raised non-operational position;

said stabilizing means including a frame member pivotally connected to said support member; and said frame member being disposed around said weighing platform when said weighing platform is in said horizontal, lowered operational position;

whereby said weighing scale has a reduced floor space when said weighing platform is in said vertical, raised non-operational position so that said weighing scale can be transported to another location for use, or for storage thereof.

5. A weighing scale according to claim 1, wherein said weighing platform is provided with ramp means on opposite sides thereof for providing access thereto.

6. A weighing scale according to claim 5, wherein each of said ramp means is provided with a hinge arrangement to permit said ramp means to be folded back onto said weighing platform when said weighing platform is in said vertical, raised non-operational position.

7. A weighing scale according to claim 6, wherein each of said ramp means is provided with releasable pin means to maintain each of said ramp means in an outwardly extended operational position relative to said weighing platform.

8. A weighing scale according to claim 1, wherein a control housing is mounted on said support member, said control housing including an upper control panel provided with weight indicating means for indicating weight of person disposed on said weighing platform when said weighing platform is in said horizontal, lowered operational position.

9. A weighing according to claim 4, wherein said weighing platform is inclined relative to said support member when in said vertical, raised non-operational position so that center of gravity of said weighing platform is disposed over said support member in a predetermined position to prevent said weighing scale from tipping over.

10. A weighing scale according to claims 4, wherein said support member is provided with wheel means for transporting said weighing scale when said weighing platform is in said vertical, raised non-operational position.

11. A weighing scale according to claim 4, wherein said support member includes means for pivoting said stabilizing means between a horizontal, lowered operational position and a vertical, raised non-operational position.

12. A weighing scale according to claim 4, wherein said weighing platform is provided with ramp means on opposite sides thereof for providing access thereto.

13. A weighing scale comprising:

a support member;

a weighing platform pivotally connected to said support member for weighing persons;

first means for pivoting said weighing platform between a horizontal, lowered operational position and a vertical, raised non-operational position;

stabilizing means being connected to said support member to prevent said weighing scale from tipping over when said weighing platform is being raised and lowered between said horizontal, lowered operational position and said vertical, raised non-operational position;

said support member including second means for pivoting said stabilizing means between a horizontal, lowered operational position and a vertical, raised non-operational position;

first safety means for preventing said stabilizing means from being raised until said weighing platform is in its said vertical, raised non-operational position; and second safety means for preventing said weighing platform from being lowered until said stabilizing means is in its said horizontal, lowered operational position;

whereby said weighing scale has a reduced floor space when said weighing platform is in said vertical, raised non-operational position so that said weighing scale can be transported to another location for use, or for storage thereof.

14. A weighing scale according to claim 13, wherein said support member is provided with wheel means for transporting said weighing scale when said weighing platform is in said vertical, raised non-operational position.

15. A weighing scale comprising:

a support member;

a weighing platform pivotally connected to said support member for weighing persons;

first means for pivoting said weighing platform between a horizontal, lowered operational position and a vertical, raised non-operational position;

stabilizing means being connected to said support member to prevent said weighing scale from tipping over when said weighing platform is being raised and lowered between said horizontal, lowered operational position and said vertical, raised non-operational position;

said support member including second means for pivoting said stabilizing means between a horizontal, lowered operational position and a vertical, raised non-operational position;

said weighing platform being provided with ramp means on opposite sides thereof for providing access thereto;

whereby said weighing scale has a reduced floor space when said weighing platform is in said vertical, raised non-operational position so that said weighing scale can be transported to another location for use, or for storage thereof.

16. A weighing scale according to claim 15, wherein each of said ramp means is provided with a hinge arrangement to permit said ramp means to be folded back onto said weighing platform when said weighing platform is in said vertical, raised non-operational position.

17. A weighing scale according to claim 16, wherein each of said ramp means is provided with a recess for receiving opposite sides of said stabilizing means therein.

18. A weighing scale according to claim 17, including safety means to prevent said stabilizing means from being lowered when said ramp means are folded back on said weighing platform.

19. A weighing scale according to claim 1, wherein said first means for pivoting said stabilizing means includes a motor for activating a ball-screw mechanism to retract and extend a piston thereof for rotating a cam, said cam being connected to lever means for pivoting said stabilizing means about an associated pin.

20. A weighing scale comprising:

a support member;

a weighing platform pivotally connected to said support member for weighing persons;

first means for pivoting said weighing platform between a horizontal, lowered operational position and a vertical, raised non-operational position;

stabilizing means being connected to said support member to prevent said weighing scale from tipping over when said weighing platform is being raised and lowered between said horizontal, lowered operational position and said vertical, raised non-operational position;

said support member including second means for pivoting said stabilizing means between a horizontal, lowered operational position and a vertical, raised non-operational position;

said stabilizing means including a frame member having two opposing spaced apart side portions, each of said side portions being pivotally connected to said support member by an associated pin; and said second means for pivoting said stabilizing means including an associated pivoting mechanism for each of said side portions;

whereby said weighing scale has a reduced floor space when said weighing platform is in said vertical, raised non-operational position so that said weighing scale can be transported to another location for use, or for storage thereof.

21. A weighing scale according to claim 20, wherein each associated pivoting mechanism includes a motor for activating a ball-screw mechanism to retract and extend a piston thereof for rotating a cam, said cam being connected to lever means for pivoting an associated one of said side portions of said frame member about its associated pin.

22. A weighing scale comprising:

a support member;

a weighing platform pivotally connected to said support member for weighing persons;

means for pivoting said weighing platform between a horizontal, lowered operational position and a vertical, raised non-operational position; and said means for pivoting said weighing platform including a motor for activating a ball-screw mechanism to retract and extend a piston thereof for rotating cams mounted on a rotatable bar, two of said cams each being connected to an associated rod for pivoting each opposite side of said weighing platform about an associated pin;

whereby said weighing scale has a reduced floor space when said weighing platform is in said vertical, raised non-operational position so that said weighing scale can be transported to another location for use, or for storage thereof.

23. A weighing scale according to claim 22, wherein said support member is provided with wheel means for transporting said weighing scale when said weighing platform is in said vertical, raised non-operational position.

24. A weighing scale according to claim 22, wherein stabilizing means are connected to said support member to prevent said weighing scale from tipping over when said weighing platform is being raised and lowered between said horizontal, lowered operational position and said vertical, raised non-operational position.

* * * * *